May 30, 1967  S. C. PEEK  3,321,862
ELECTRICAL INSECT KILLER
Filed Dec. 28, 1964

INVENTOR.
Sandford C. Peek
BY
Roberts, Cushman & Grover
ATT'YS

United States Patent Office 3,321,862
Patented May 30, 1967

3,321,862
ELECTRICAL INSECT KILLER
Sandford C. Peek, Ipswich, Mass., assignor to Sylvania Electric Products Inc., a corporation of Delaware
Filed Dec. 28, 1964, Ser. No. 421,232
3 Claims. (Cl. 43—112)

ABSTRACT OF THE DISCLOSURE

An electrical insect killer having closely spaced electrodes forming an air gap to which a pulsing voltage is applied at intervals between pulses long enough to allow individual insects to fall away from the electrodes rather than to fuse between and short-circuit the electrodes.

---

Typical known electrical insect traps have two sets of electrodes arrayed on a chassis. A continuous high voltage is applied from a direct or alternating current supply between alternate electrodes of different sets. When the body of an insect shortens the air gap between two electrodes of different sets an arc strikes through the air and the insect. With prior current supplies the discharge continued so long as the insect body shortened the discharge path and fused the insect body to one or both of the discharging electrodes. As a result the insects cumulatively clog the spaces between the electrodes substantially reducing their effective area, and in some cases constituting an excessive and unnecessary power drain. In agricultural installations where large quantities of large insects are to be killed the clogging of the electrodes becomes so extensive as to render prior traps quite unsatisfactory. In household installations prior traps similarly become ineffective, and further present a hazard to humans and animals because of their characteristics of continued high voltage discharge.

The object of the present invention is to provide an electrical insect trap with a very slight tendency, if any, to burn or fuse insects to its electrodes, which is more effective yet with a reduced power drain, and which does not present an electrical hazard to humans or animals.

According to the invention an electrical insect killer comprises a chassis, at least two electrodes mounted in insulated relation on said chassis and spaced to discharge through an insect body therebetween, a two terminal direct current supply for said electrodes, respective terminals being connected to respective electrodes, a storage capacitor across said terminals, and resistance means in series with one terminal, said resistance means and capacitor being of value to extend the time to charge said capacitor so as to limit the power of discharge between electrodes and oppose drain on said power supply, whereby to prevent continuous discharge tending to fuse insects to the electrodes.

For the purpose of illustration typical embodiments of the invention are shown in the accompanying drawing in which.

Figure 1:
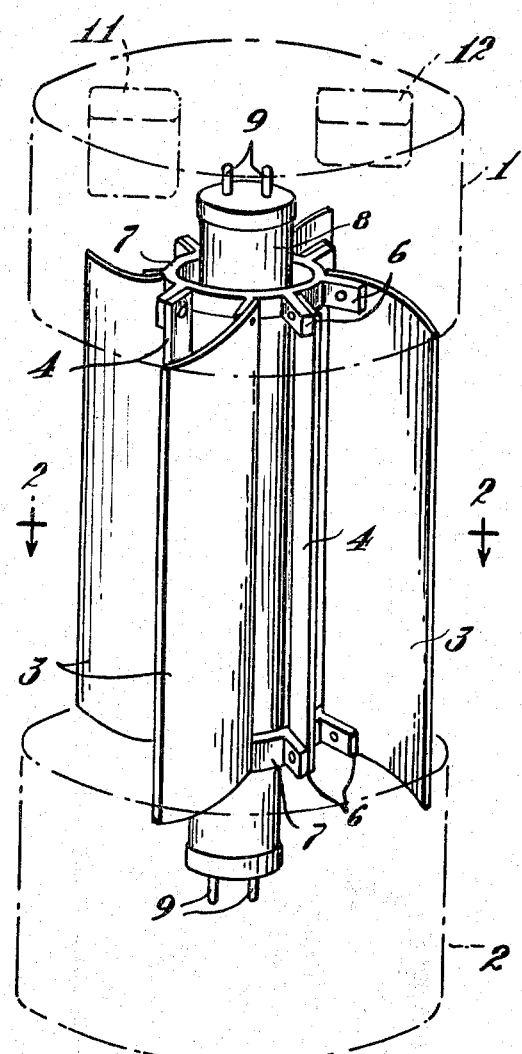
FIG. 1 is a somewhat schematic elevation of an insect trap.
Figure 2:
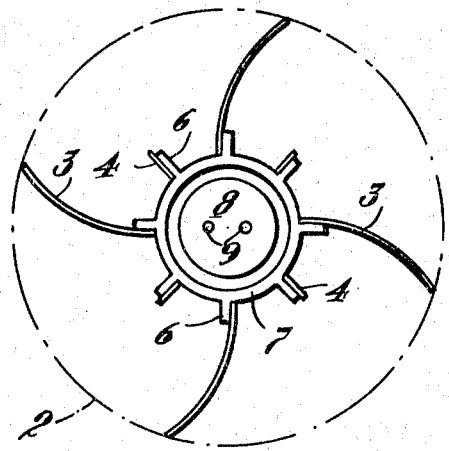
FIG. 2 is a section on line 2—2 of FIG. 1.

As shown in FIGS. 1 and 2 an insect trap comprises an upper hood 1 and a lower cup 2 between which extend two vertical sets of curved electrodes, a wider set 3 extending approximately to the periphery of the hood and cup, and a narrow set 4. The two sets of electrodes are mounted on tabs 6 of upper and lower insulating rings 7. A fluorescent lamp 8 with terminal pins 9 extends through both rings concentrically with the sets of electrodes. The manner in which the electrode assembly and lamp are shaped and mounted between the hood 1 and cup 2 are not claimed as part of the present invention.

Within the hood 1 are mounted a conventional ballast 11 for connection to the terminal pins 9 of the lamp 8, and a circuit 12 supplying high voltage to the electrodes 3 and 4. The ballast 11 is connected between line terminals A and C and the lamp terminal pins in a conventional manner.

Figure 3:
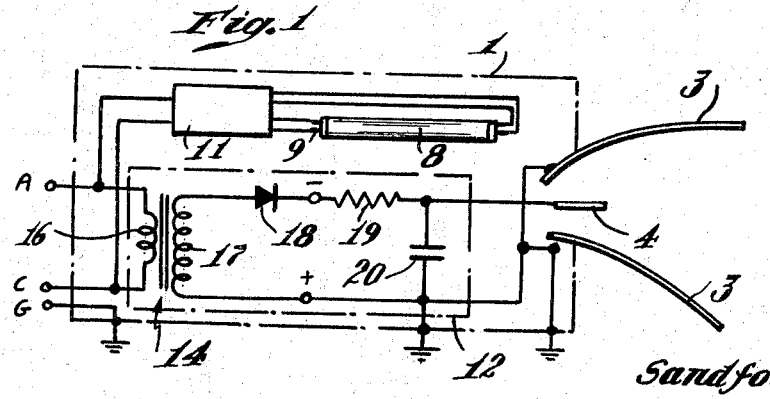
FIG. 3 is a schematic diagram of an electrical circuit for the insect killer.

According to the invention one form of high voltage power supply shown in FIG. 3 comprises a transformer 14 whose primary 16 is connected to the line terminals A and C which usually supply 110 volt alternating current. A ground wire terminal G is connected to the hood 1 or other metal chassis in the hood. The transformer secondary 17 which steps the voltage up is connected on one side directly to the wide electrodes 3. The other side is connected through a diode 18 or other power rectifier and a resistor 19 to the narrow electrodes 4.

The transformer 14 and half wave rectifier diode constitute a cyclic high voltage direct current supply with a positive terminal (+) grounded to the hood chassis 1, and a negative terminal (−), the resistor 19 being in series with the negative terminal (−), and a storage capacitor 20 being connected across the two high voltage terminals.

According to the invention a high voltage charge, somewhat below the breakdown potential between any two electrodes 3 and 4, is stored in the capacitor 20 and a discharge between the electrodes is triggered by the approach of an insect between the electrodes. After the initial discharge a further discharge is delayed until the capacitor is re-charged through the resistor 19. The delay allows time for the insect to drop from the electrodes into the cup 2 before it burns and fuses to an electrode. The delay also lowers the rate at which power is consumed and permits the use of a lower power transformer.

The value of the resistance is chosen to limit to a safe value the current drawn from the high voltage supply in charging the capacitor. In household installations a voltage under 4000 and a current under 2 milliamperes are considered safe, and are provided with a resistor of 2.8 megohms. A capacitor with a value of 0.025 microfarad with a 2.8 megohm resistor provides a delay time constant of 0.07 second which allows adequate time between discharge for an insect to fall from the electrodes, and which also substantially reduces power drain and transformer capacity.

Figure 4:
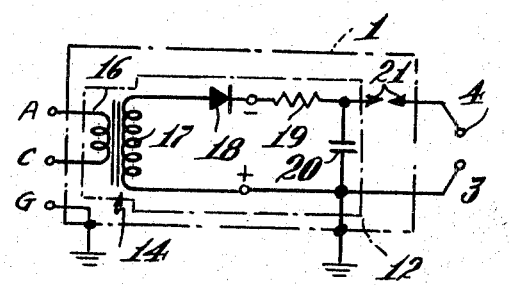
FIG. 4 is a modified form of electrical circuit.

The circuit of FIG. 3, and particularly the circuit of FIG. 4, are especially useful in agricultural installations. In fields of the Southwest United States, for example, horn worms with body width of two inches infest fields in great numbers. Where prior electrical insect traps are quickly clogged, the present trap effectively disposes of such large insects. Under these conditions with outdoor installations the collecting function of the cup 2 may be dispensed with. That is, the cup may divert or pass the insect bodies out of the trap to the ground below.

The high voltage circiut of FIG. 4 differs from that of FIG. 3 by the inclusion of an air gap between two electrodes 21. If an insect of large mass should trigger a discharge between the electrodes 3 and 4 and temporarily remain between the electrodes, the potential drop across the capacitor 20 is divided between the drop across the air gaps between the electrodes 21 and the electrodes 3 and 4. Most of the energy of the discharge is expended in the air gap between the electrodes 21 thus preventing burning of the insects between electrodes 3 and 4. However, enough energy is expended through the insect in a few brief pulses to knock it loose from the electrodes 3 and 4 before it is fused thereto.

In household installations the 4000 volt power supply, 2.8 megohm resistor and 0.025 microfarad capacitor produce a discharge which is quite harmless to humans and animals. Placing a finger between the electrodes 3 and 4 causes periodic discharges whose net effect is not uncomfortable and causes no injury. In open field installations, where such contact is unlikely, a capacitor of value as high as 2 microfarads can be used to provide a discharge with greater energy.

Another important function of the air gap arises when a very large insect so substantially lowers the impedance between electrodes 3 and 4 that recharge of the capacitor would be prevented by current drain through the insect were the air gap lacking. The air gap breaks the discharge path until a substantial charge accumulates on the capacitor.

While specific circuits and component values have been described by way of illustration, it should be understood that this invention includes all modifications and equivalents which fall within the scope of the appended claims.

I claim:

1. An electrical insect killer comprising a chassis, at least two electrodes mounted in insulated relation on said chassis and closely spaced to discharge through an insect body and the reduced air gap therebetween, a two terminal cyclic direct current supply for said electrodes, respective terminals being conected to respective electrodes, a storage capacitor across said terminals, and resistance means in series with one terminal, said resistance and capacitor being of values to extend the time to charge said capacitor beyond one cycle of said current supply so as to limit the power of discharge between electrodes and oppose drain on said power supply, whereby to prevent continuous discharge tending to fuse insects to the electrodes and to produce periodic discharges through said air gap only when an insect is therein at intervals allowing the insect to fall from the electrodes.

2. An electrical insect killer according to claim 1 wherein said direct current supply comprises a transformer having a primary and secondary, the secondary being connected in a circuit including a rectifier and said electrodes in series, and said secondary circuit including said resistance means.

3. An electrical insect killer according to claim 2 characterized in that said secondary circuit includes additional spaced electrodes forming an air gap in series with the first said two electrodes for breaking said circiut until the aforesaid capacitor is substantially charged.

References Cited
UNITED STATES PATENTS

| | | | |
|---|---|---|---|
| 2,061,458 | 11/1936 | Folmer et al. | 43—112 |
| 2,401,815 | 6/1946 | Dalziel | 256—10 |
| 2,941,328 | 6/1960 | Streat | 43—112 |
| 3,243,913 | 4/1966 | Carriero | 43—98 |
| 3,258,872 | 7/1966 | Senkewich | 43—112 X |

SAMUEL KOREN, *Primary Examiner.*

WARNER H. CAMP, *Examiner.*